Figure 1:
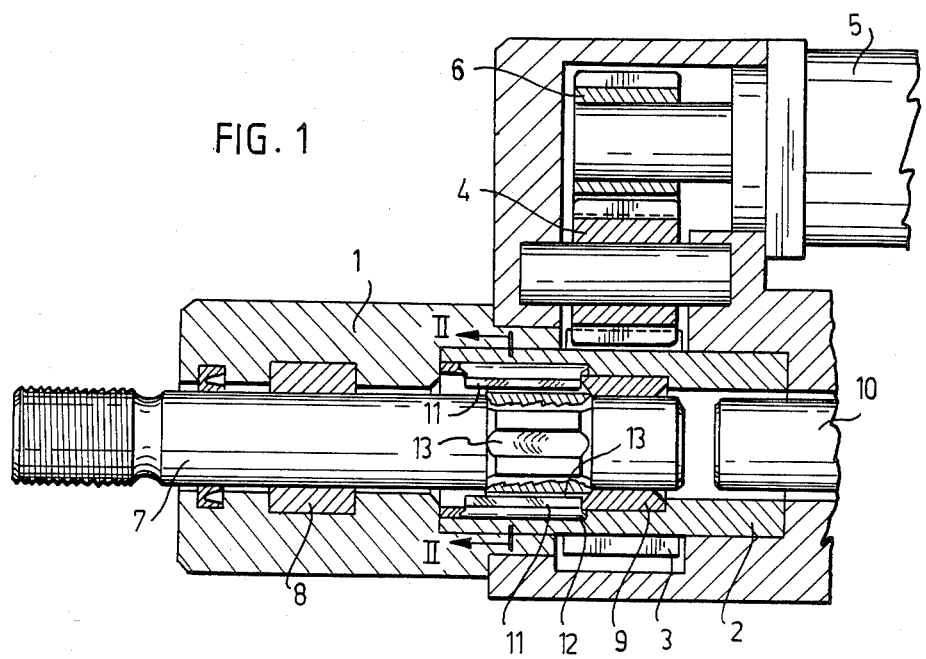

United States Patent

Salmi et al.

[11] Patent Number: 4,702,326
[45] Date of Patent: Oct. 27, 1987

[54] COUPLING ARRANGEMENT FOR A DRILL SHANK OF A PERCUSSION DRILLING MACHINE

[75] Inventors: Pekka Salmi, Tampere; Timo Muuttonen, Nastola, both of Finland

[73] Assignee: Oy Tampella AB, Tampere, Finland

[21] Appl. No.: 742,464

[22] Filed: Jun. 7, 1985

[30] Foreign Application Priority Data

Jul. 3, 1984 [FI] Finland ................... 842674

[51] Int. Cl.$^4$ ............................. B23B 45/16
[52] U.S. Cl. ..................... 173/104; 175/415
[58] Field of Search ............... 173/104, 105, 109, 73; 175/415; 279/19.3, 19.7, 19.6

[56] References Cited

U.S. PATENT DOCUMENTS

| | | | |
|---|---|---|---|
| 3,517,754 | 6/1970 | Hughes | 279/19.3 X |
| 3,595,593 | 7/1971 | Gold | 279/123 X |
| 3,866,746 | 2/1975 | Corington | 173/73 |
| 4,491,445 | 1/1985 | Hunger et al. | 279/19.3 X |

Primary Examiner—E. R. Kazenske
Assistant Examiner—Willmon Fridie, Jr.
Attorney, Agent, or Firm—Ladas & Parry

[57] ABSTRACT

A coupling arrangement for a percussion drilling machine for coupling of a shank (7) unrotatably to a frame bushing (2) rotatably mounted in a frame and rotated by a rotating device. The frame bushing is provided with axial driving grooves (12) opening towards the shank and the shank is provided with axial counter grooves (13) opening towards the frame bushing. Rod-like wedge pieces (11) are mounted each in a pair of grooves formed by the grooves. The cross-section of each wedge piece comprises an arched surface portion (11a) and at least one planar surface portion (11b). Such wedge piece can adjust its position by turning in one groove of the pair of grooves so that the planar surface of the wedge piece is pressed into a planar contact with the planar surface of the other groove.

9 Claims, 10 Drawing Figures

COUPLING ARRANGEMENT FOR A DRILL SHANK OF A PERCUSSION DRILLING MACHINE

This invention relates to a coupling arrangement for a percussion drilling machine for coupling of a shank unrotatably to a frame bushing and rotatably mounted in a frame and rotated by a rotating device, whereby said arrangement comprises axial driving grooves provided in said frame bushing to face said shank, axial counter grooves provided in said shank to face said frame bushing, and rod-like wedge pieces positioned in groove pairs formed by said driving grooves and counter grooves, said wedge pieces in contact with counter surfaces formed in said grooves.

In a percussion drilling machine, the rotating motion required in the drilling operation is transmitted from a rotatory motor of the drilling machine first to a frame bushing mounted in the frame and further to a shank extending inside said frame bushing. In order to transmit the rotation torque from the frame bushing to the shank, it is previously known to use loose wedge pieces positioned there-between, whereby each wedge piece is fitted partly into a groove provided in the frame bushing and partly into a groove provided in the shank so that said wedge pieces couple the shank to rotate with the frame bushing.

Such coupling arrangements between the shank and the frame bushing are disclosed in Finnish Patent Application No. 821,725, Swedish Patent Specification No. 346,827, German Offenlegungsschrift No. 2,348,850 and U.S. Pat. No. 3,866,746.

Finnish Patent Application No. 821,725 suggests the use of round-headed rod elements as wedge pieces for fastening of a tool arm in a fastening bushing, whereby elongated openings extending through the fastening bushing are provided in the bushing for said rod elements. In this kind of arrangement, a linear contact occurs between the rod elements and the edges of the openings provided in the fastening bushing. This causes during the operation of the drilling machine high surface pressures, among other things, whereby an efficient lubrication is required.

Swedish Patent Specification No. 346,827 suggests using as wedge pieces rod-like fingers of a resilient material in combination with grooves of a special design formed in the shank and in a frame bushing. This kind of arrangement indeed makes it possible for the fingers to adjust their position in the grooves but the manufacture of the wave-like cuttings forming said grooves makes the arrangement inconvenient as well as expensive.

German Offenlegungsschrift No. 2,348,850 suggests using as wedge pieces single bars, which fill up the counter grooves provided in the shank and adjust their shape in the shank so that the shank can be coupled to the drilling machine. Said bars, however, have such a cross-section that they are not capable of adjusting their position, because the bars assume a stationary position in the grooves. The surface pressures are decreased only after the grooves have worn out.

U.S. Pat. No. 3,866,746 suggests using as wedge pieces bars formed by rectangular segments, which bars are positioned in a slightly asymmetrical manner in rectangular counter grooves provided in the shank, so that the bars are subjected to a torque pressing the bars towards the center, when the drill rotates in a certain direction. However, such bars are not capable of adjusting their position in their grooves.

The object of this invention is to provide a coupling arrangement which avoids the above disadvantages. This object is achieved by means of a coupling arrangement according to the invention, which is characterized in that each wedge piece, viewed in the crosssection thereof, comprises at least one arched surface portion and at least one essentially planar surface portion and that in the driving and the counter grooves the counter surfaces making contact with said wedge piece are over the contact area of the same shape as said surface portions of the wedge piece.

The invention is based on the idea that a possibility is provided for the wedge piece to change its position in one groove so that said wedge piece assumes a planar contact with the other groove. By means of the structure according to the invention, it is possible for the wedge piece to obtain the correct position in the pair of grooves even when the wedge piece is still new, because the frame bushing and the shank are correspondingly provided with grooves of a suitable shape for the wedge piece, i.e. one groove having a cross-section which forms an arched surface in one part and one groove which forms a planar surface in the other part. Thereby the planar surface of the wedge piece and the planar surface of the corresponding groove are positioned against each other and the arched surface of the wedge piece and the arched surface of the corresponding groove are concentrically positioned against each other, because said planar surfaces can move with respect to each other in the plane of said surfaces. Because the wedge piece is able to turn in one groove around the axis thereof in a manner similar to a pivot, the planar surface of the wedge piece can somewhat correct the position thereof so that it is pressed accurately against the planar surface of the other groove, supposing said planar surfaces are not exactly in parallel at the time of coupling.

Such wedge pieces and corresponding grooves are also easy to manufacture with a required precision by means of conventional machining methods.

According to the invention, the shape of the wedge pieces is such that the radial forces caused by the transmission of the rotation torque tend to center the shank and stretch the frame bushing due to the wedge effect caused by the planar surfaces of the wedge pieces. Therefore, the coupling serves as a resilient clutch, whereby chocks caused by torsional vibration are dampened.

It is advantageous that the wedge piece comprises two planar surface portions, so that the wedge piece can independently adjust its position in both directions of rotation of the shank. By means of two planar surfaces, the wedge pieces can assume their correct position both during the drilling operation and when releasing the threaded connections of the drill rods in extension rod drilling by rotating the drill in the opposite direction.

Figure 2:
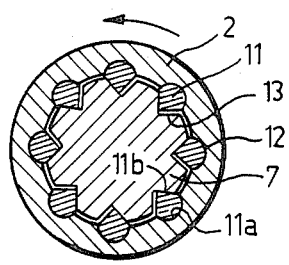
Figure 3:
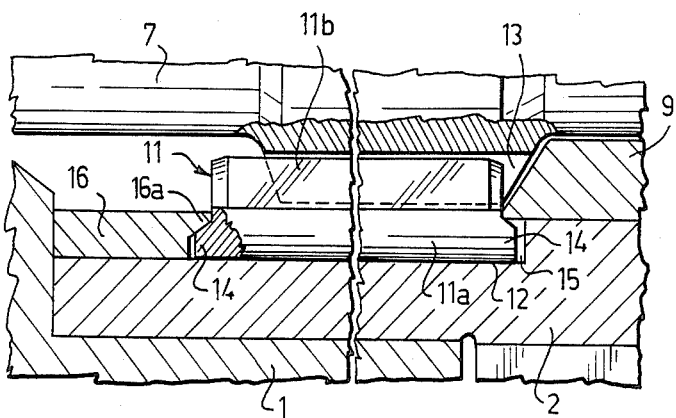
Figure 4:
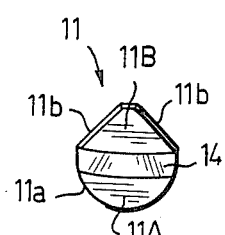
Figure 5:
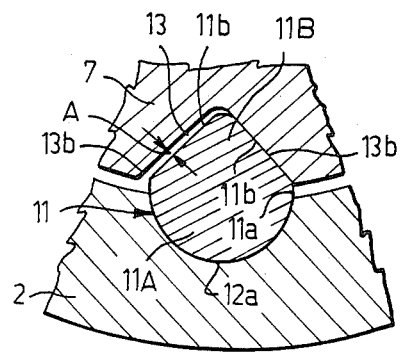
Figure 6:
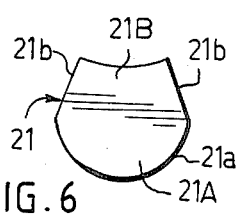
Figure 7:
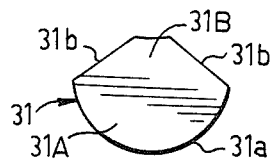
Figure 8:
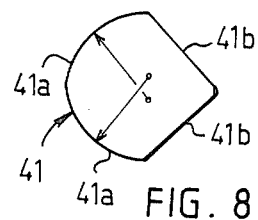
Figure 9:
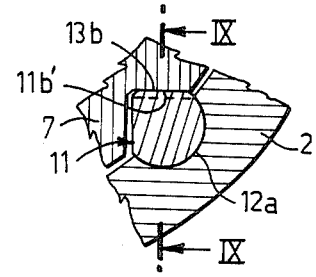
Figure 10:
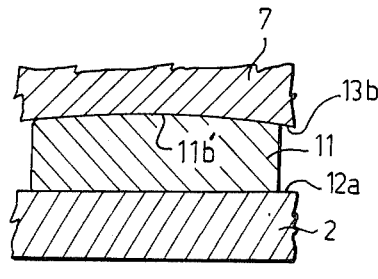

The invention will be described more closely in the following with reference to the attached drawings, wherein FIG. 1 is an axial section of a percussion drilling machine provided with a coupling arrangement according to invention, FIG. 2 is a section along line 2—2 in FIG. 1, FIG. 3 is an enlarged axial section of a coupling joint, FIG. 4 is an end view of a wedge piece, FIG. 5 is an enlarged cross-section of the coupling joint, FIG. 6–8 illustrate alternative profile forms of the wedge piece, and FIGS. 9 and 10 are a cross-section and a section along line IX—IX in Figure respectively of the coupling joint, when using an alternative embodiment of the wedge piece.

The percussion drilling machine illustrated in FIG. 1 of the drawings comprises a frame 1 and a frame bushing 2 rotatably mounted in said frame and provided with a tooth rim 3. The bushing is by means of an intermediate cog wheel 4 in rotational engagement with a cog wheel 6 rotated by a hydraulic motor 5.

The drilling machine further comprises a shank 7, the forward end of which is rotatably mounted in said frame by means of a bearing bushing 8, the backward end being rotatably mounted in the frame bushing by means of a drill bushing 9. A percussion piston, which directs axial strokes on the end of the shank, is indicated with the reference numeral 10.

The shank is unrotatably but axially slidably coupled to the frame bushing by means of a coupling arrangement which comprises a number of rod-like wedge pieces 11 uniformly spaced between the shank and the frame bushing. A corresponding number of axial driving grooves 12 is provided for said wedge pieces in a cylindrical inner surface of the frame bushing, a corresponding number of counter grooves 13 being formed radially adjacent said driving grooves in a cylindrical outer surface of the shank.

In the present embodiment, the wedge piece 11 comprises a part 11A having an essentially semi-circular cross-section and an adjoining part 11B having an essentially triangular cross-section. The latter part forms a surface 11a having the shape of a circular arc, while the former part forms two planar surfaces 11b which form an angle with respect to each other.

Each counter groove 13 of the shank has a V-shaped cross-section, which corresponds to the triangular part of the wedge piece and forms two planar surfaces 13b. Each driving groove 12 of the frame bushing has a semi-circular cross-section, which corresponds to the semi-circular part of the wedge piece and forms a surface 12a having the shape of a circular arc. The dimensions are such as to allow the wedge pieces to be fitted into the grooves thereof with a small clearance A, FIG. 5, and permit an axial movement of the shank with respect to the wedge pieces under the influence of the strokes effected by the percussion piston.

The described coupling arrangement couples the shank unrotatably to the frame bushing so that the shank rotates in both directions together with said frame bushing. It appears from FIG. 5 in particular that the semi-circular part 11A of the wedge piece is able to somewhat turn around the axis thereof in the driving groove of the frame bushing so that the planar surface 11b of the wedge piece may adjust its position in such a manner that said planar surface is pressed over the whole width thereof against the corresponding planar surface 13b of the counter groove provided in the shank, when the frame bushing rotates the shank. A corresponding pressing of planar surfaces against each other also occurs when the frame bushing rotates in the opposite direction. It further appears from FIG. 5 that when the frame bushing rotates the shank, the rotation torque subjects the wedge pieces to radial forces, which forces, on account of the wedge effect of the planar surfaces 11b, 12b, tend, on one hand, to center the shank and, on the other hand, to stretch the frame bushing so that the coupling acts as a resilient clutch between the frame bushing and the shank.

The ends of the wedge piece are provided with locking claws 14, which, when the wedge piece is mounted in place in the driving groove of the frame bushing, are inserted in a recess 15 provided in the frame bushing and, correspondingly, under a retaining edge 16a of a locking sleeve 16 mounted inside the frame bushing. Said edge maintains all wedge pieces in place. The wedge pieces, however, are able to turn in the grooves thereof in a manner described above.

FIGS. 6 and 7 illustrate certain alternative profile forms of the wedge pieces. The wedge pieces 21 and 31 illustrated therein comprise a semi-circular part 21A and 31A respectively, which forms an arched surface 21a and 31a respectively, and a part 21B and 31B respectively, which forms two planar surfaces 21b and 31b respectively.

FIG. 8 illustrates an alternative profile form of the wedge piece, which comprises two arched surfaces 41a and two planar surfaces 41b. This solution allows the load acting on the wedge piece to be distributed on the surfaces of the wedge piece in a desired manner by suitably choosing the positions of the centers of curvature of the arched surfaces.

FIGS. 9 and 10 illustrate another alternative profile form of the wedge piece. This profile form corresponds to the wedge piece 11 shown in cross-section in FIG. 5 except that one surface 11b' of the triangular part 11B is slightly convex in the longitudinal cross-section of the wedge piece, as appears from FIG. 10. Therefore, one surface 13b' of the counter groove 13 provided in the shank has a corresponding concave shape.

The drawings and the description related thereto are only intended to illustrate the idea of the invention. In its details, the coupling arrangement according to the invention may vary within the scope of the claims. Thus, it is possible that the grooves having arched surfaces are formed in the shank and the grooves having planar surfaces in the frame bushing.

We claim:

1. A coupling arrangement of a percussion drilling machine, comprising:
    a shank unrotably attached to a frame bushing, the frame bushing being mounted within a frame for rotation by rotating means,
    a plurality of axial driving grooves facing the shank being provided within the frame bushing,
    a plurality of axial counter grooves facing the frame bushing being provided within the shank,
    a plurality of wedge shaped pieces positioned within groove arrangements, each said groove arrangement being defined by at least one said driving groove and corresponding counter groove facing each other, counter surfaces of each groove arrangement adapted to closely receive the wedge shaped piece, the counter surfaces of each groove arrangement directly participating in transmitting a rotational movement from the frame bushing to the shank,
    in a cross-section each wedge shaped piece having at least one arched surface and at least one substantially planar surfaces each starting at an end of the arched surface, said two planar surfaces converging towards each other in a wedge like manner, each wedge-shaped piece being rotatable about a longitudinal axis thereof within the counter surfaces of its respective groove so that during rotation of the shank by the frame bushing each of said wedges can rotate therein until at least one of said planar surfaces and said arched surface are in uniform contact with their respective counter surfaces of the groove arrangement, whereby said wedges can compensate for worn or mishaped grooves.

2. A coupling arrangement according to claim 1 wherein the arched surface of the wedge-shaped piece is turning around the longitudinal axis thereof in a such manner that at least one planar surface adjusting a position in a such manner that the planar surface is pressed over the entire surface thereof against a corresponding 3. A coupling arrangement according to claim 1 wherein one side of the wedge shaped piece has an essentially semi-circular cross-section, othe side being essentially triangular.

4. A coupling arrangement according to claim 3 wherein a cross-section of the driving grooves of the frame bushing essentially has the shape of a circular arc, a radius of said arc corresponding to that of the circular arc of the wedge shaped piece.

5. A coupling arrangement according to claim 3, wherein the counter grooves of the shank have an essentially V-shaped cross-section, an apex angle of said groove corresponding to that of the triangle of the wedge shaped piece.

6. A coupling arrangement according to claim 5, wherein in the triangle of the wedge piece at least one surface portion is arched in the longitudinal cross-section of the wedge piece and in the counter groove of the shank one surface has a corresponding arched shape.

7. A coupling arrangement according to claim 1 wherein opposite ends of the wedge pieces are provided with locking claws and the frame bushing is provided with a locking sleeve having a retaining edge to be engaged with said locking claws of the wedge pieces.

8. A coupling arrangement according to claim 1 wherein the wedge piece comprises two arched surface portions and two planar surface portions.

9. A coupling arrangement according to claim 8, wherein the cross-section of said arched surface portions (41a) has the shape of a circular arc.

* * * * *